(12) United States Patent
Khare et al.

(10) Patent No.: US 9,947,118 B2
(45) Date of Patent: Apr. 17, 2018

(54) NON-INTERFEROMETRIC PHASE MEASUREMENT

(71) Applicant: Indian Institute of Technology Delhi, New Delhi (IN)

(72) Inventors: Kedar Bhalchandra Khare, New Delhi (IN); Manoj Kumar Sharma, Tucson, AZ (US); Paramasivam Senthilkumaran, New Delhi (IN)

(73) Assignee: INDIAN INSTITUTE OF TECHNOLOGY DELHI, Hanz Khas (IN)

( * ) Notice: Subject to any disclaimer, the term of this patent is extended or adjusted under 35 U.S.C. 154(b) by 373 days.

(21) Appl. No.: 14/723,341

(22) Filed: May 27, 2015

(65) Prior Publication Data
US 2015/0346027 A1    Dec. 3, 2015

(30) Foreign Application Priority Data
May 28, 2014  (IN) .......................... 1413/DEL/2014

(51) Int. Cl.
*G01J 9/00* (2006.01)
*G06T 11/20* (2006.01)
*G02B 21/14* (2006.01)

(52) U.S. Cl.
CPC ................. *G06T 11/20* (2013.01); *G01J 9/00* (2013.01); *G02B 21/14* (2013.01)

(58) Field of Classification Search
None
See application file for complete search history.

(56) References Cited

U.S. PATENT DOCUMENTS

| 2007/0027689 A1 | 2/2007 | Ozcan et al. |
| 2013/0193322 A1* | 8/2013 | Blackburn ............ H01J 37/147 250/311 |
| 2015/0219686 A1* | 8/2015 | Humphris ............. B82Y 35/00 850/6 |

FOREIGN PATENT DOCUMENTS

| JP | S63238525 A | 10/1988 |
| JP | H08114909 A | 5/1996 |

(Continued)

OTHER PUBLICATIONS

Allen, L.J., et al., "Phase retrieval and aberration correction in the presence of vortices in high-resolution transmission electron microscopy," Ultramicroscopy, vol. 88, Issue 2, pp. 85-97 (Jul. 2001).

(Continued)

*Primary Examiner* — Charlie Y Peng
(74) *Attorney, Agent, or Firm* — Turk IP Law, LLC

(57) ABSTRACT

Techniques described herein are generally related to non-interferometric phase measurements of an optical signal. The various described techniques may be applied to methods, systems, devices or combinations thereof. Some methods for determining phase data of the optical signal may include transmitting the optical signal through a first optical element and obtaining first intensity data at a first focal plane of the first optical element by an optical sensor. Example methods may also include transmitting the optical signal through a second optical element. The second optical element may include a phase transformation mask. Example methods may further include obtaining a second intensity data at a second focal plane of the second optical element by the optical sensor and determining the phase data for the optical signal based on the first intensity data and the second intensity data.

26 Claims, 6 Drawing Sheets

(56) References Cited

FOREIGN PATENT DOCUMENTS

| JP | H11281492 A | 10/1999 |
| JP | 2002090126 A | 3/2002 |
| JP | 2005315596 A | 11/2005 |
| JP | 2006090728 A | 4/2006 |
| JP | 2006234389 A | 9/2006 |
| JP | 2007192665 A | 8/2007 |
| JP | 2008193480 A | 8/2008 |
| JP | 2008216219 A | 9/2008 |
| JP | 2010079514 A | 4/2010 |
| JP | 2011002359 A | 6/2011 |
| JP | 2011209571 A | 10/2011 |

OTHER PUBLICATIONS

Almoro, P., et al., "Complete wavefront reconstruction using sequential intensity measurements of a volume field," speckle Applied Optics, vol. 45, Issue 34, pp. 8596-8605 (2006).

Anand, A., et al., "Wavefront sensing with random amplitude mask and phase retrieval," Optics Letters, vol. 32, Issue 11, pp. 1584-1586 (2007).

Brady, G.R., and Fienup, J.R., "Measurement of an Optical Surface using Phase Retrieval," Optical Society of America, pp. 1-3 (2006).

Candès, E.J., et al., "Phase Retrieval via Matrix Completion," Computer Science, Computer Science, pp. 1-24 (Aug. 2011).

Fienup, J.R., "Phase retrieval algorithms: a comparison," Applied Optics, vol. 21, Issue 15, pp. 2758-2769 (Aug. 1, 1982).

Fienup, J.R., "Reconstruction of an object from the modulus of its Fourier transform," Optics Letters, vol. 3, Issue, 1, pp. 27-29 (Jul. 1978).

Gerchberg, R.W., and Saxton, W.O., "A Practical Algorithm for the Determination of Phase from Image and Diffraction Plane Pictures," Optik, vol. 35, No. 2, pp. 237-246 (1972).

Gureyev, T.E., and Nugent, K.A., "Rapid quantitative phase imaging using the transport of intensity equation," Opt. Commun., vol. 133, Issues 1-6, pp. 339-346 (Jan. 1, 1997).

Ishizuka, K., and Allman, B., "Phase measurement of atomic resolution image using transport of intensity Equation," Journal of Electron Microscopy, vol. 54, No. 3, pp. 191-197 (Jun. 2005).

Khare, K., "Complex signal representation, Mandel's theorem, and spiral phase quadrature transform," Applied Optics, vol. 47, Issue 22, pp. E8-E12 (2008).

Larkin, K.G., et al., "Natural demodulation of two-imensional fringe patterns. I. General background of the spiral phase quadrature transform," J. Opt. Soc. Am. A, vol. 18, No. 8, pp. 1862-1870 (2001).

McVitie, S., and Ngo, D.T., "Quantitative measurements of phase using the transport of intensity equation," Journal of Physics: Conference Series, vol. 126, No. 1, pp. 012041-012044 (2008).

Migukin, A., et al., "Wave field reconstruction from multiple plane intensity-only data: augmented Lagrangian algorithm," J. Opt. Soc. Am., vol. 28, No. 6, pp. 993-1002 (Jun. 2011).

Mitome, M., et al., "Quantitativeness of phase measurement by transport of intensity equation," Journal of Electron Microscopy, vol. 59, No. 1, pp. 33-41 (2010).

Paganin, D., "Phase Retrieval With the Fast Fourier Transform," Chapter 4, pp. 67-72 (1999).

Rodrigo, J.A. et al., "Characterization of holographically generated beams via phase retrieval based on Wigner distribution projections," Optics Express, vol. 19, No. 7, pp. 6064-6077 (Mar. 28, 2011).

Teague, M.R., "Deterministic phase retrieval: a Green's function solution," Journal of the Optical Society of America, vol. 73, Issue 11, pp. 1434-1441 (1983).

Volkov, V.V., et al., "A new symmetrized solution for phase retrieval using the transport of intensity equation," Micron, vol. 33, Issue 5, pp. 411-416 (2002).

Wei, G-X., et al., "Phase retrieval and coherent diffraction imaging by a linear scanning pinhole sampling array," Optics Communications, vol. 284, Issue 12, pp. 2720-2725 (Jun. 1, 2011).

Sharma, M.K., et al., "Phase imaging using spiral-phase diversity," Applied Optics, vol. 54, No. 13, pp. 3979-3985 Optical Society of America (May 1, 2015).

Weng Ciang Cong et al., Recursive algorithm for phase retrieval in the fractional Fourier transform domain, https://www.osapublishing.org/ao/abstract_cfm?uri=ao-37/29/6906; vol. 37, Issue 29, pp. 6906-6910 (1998).

* cited by examiner

NON-INTERFEROMETRIC PHASE MEASUREMENT

CROSS-REFERENCE TO RELATED APPLICATION

This application claims priority under 35 U.S.C. 119(a) of Indian Patent Application No. 1413/DEL/2014, filed on May 28, 2014. The disclosure of the Indian Patent Application No. 1413/DEL/2014 is incorporated herein by reference in its entirety.

BACKGROUND

Unless otherwise indicated herein, the approaches described in this section are not prior art to the claims in this application and are not admitted to be prior art by inclusion in this section.

Optical signals can be characterized by their amplitude and phase data. Such phase data may be used in design and analysis of imaging systems. For example, microscopes, cameras, adaptive telescopes can utilize near real time phase correction to compensate for atmospheric turbulence, eye defect metrology, surface profiling and laser beam shaping.

Conventional interferometers can be used for phase measurement. Such interferometers may have complex designs.

SUMMARY

Techniques described herein are generally related to non-interferometric phase measurements of an optical signal. The various described techniques may be applied to methods, systems, devices or combinations thereof. In some examples, methods for determining phase data of the optical signal may include transmitting the optical signal through a first optical element and obtaining first intensity data at a first focal plane of the first optical element by an optical sensor. An example method may also include transmitting the optical signal through a second optical element. The second optical element may include a phase transformation mask. An example method may further include obtaining a second intensity data at a second focal plane of the second optical element by the optical sensor and determining the phase data for the optical signal based on the first intensity data and the second intensity data.

According to some examples of the present disclosure, apparatus for determining phase data of an optical signal are described. An example apparatus may include an optical assembly including a first optical element and a second optical element. The apparatus may be configured to transmit the optical signal through the first optical element and the second optical element. The second optical element may include a phase transformation mask. Example apparatus may also include an optical sensor placed in a first focal plane of the first optical element and in a second focal plane of the second optical element. The optical sensor may be configured to obtain first intensity data at the first focal plane of the first optical element and to obtain second intensity data at the second focal plane of the second optical element. The first intensity data and the second intensity data may correspond to the transmitted optical signal. The apparatus may further include an image processor coupled to the optical sensor. The image processor may be configured to process the first intensity data and the second intensity data to determine phase data of the optical signal.

According to some examples of the present disclosure, methods related to determining phase data of an optical signal are described. The methods may include obtaining first intensity data and second intensity data. The first intensity data may be generated by an optical sensor based on transmission of the optical signal through an object and a first optical element and the second intensity data may be generated by the optical sensor based on transmission of the optical signal through the object and a second optical element. The second optical element may include a phase transformation mask. The method may further include initializing a first field value based on the first intensity data and a guess phase value. An example method may include determining the phase data of the optical signal based on the first field value, a spiral phase constraint and an aperture constraint. The spiral phase constraint may correspond to the phase transformation mask and the aperture constraint may correspond to the first optical element.

According to some examples of the present disclosure, methods related to determining phase data for an optical signal are described which may include transmitting the optical signal through a first optical element to obtain a first transmitted beam and obtaining first intensity data for the first transmitted beam. The method may also include transmitting the optical signal through a second optical element to obtain a second transmitted beam. The second optical element may include a phase transformation mask. The method may further include obtaining second intensity data for the second transmitted beam and determining the phase data for the optical signal based on the first intensity data and the second intensity data.

According to some examples of the present disclosure, methods related to forming an image of an object are described. The methods may include directing a light beam towards the object to produce an optical signal from an interaction between the light beam and the object and transmitting the optical signal through a first optical element to obtain a first transmitted beam. An example method may also include obtaining first intensity data for the first transmitted beam and transmitting the optical signal through a second optical element to obtain a second transmitted beam. The second optical element may include a phase transformation mask. An example method may further include obtaining second intensity data for the second transmitted beam and determining phase data for the optical signal based on the first intensity data and the second intensity data. An image of the object may be formed using the phase data.

According to some examples of the present disclosure, non-transitory computer readable mediums are described. Some example non-transitory computer readable mediums may include computer-executable instructions stored thereon that are executable by a processor to perform or cause to be performed various methods to retrieve data in a computer system with a multi-level cache. Example methods may include obtaining first intensity data and second intensity data corresponding to an optical signal. A first field value may be initialized based on the first intensity data and a guess phase value. Phase data of the optical signal may be determined based on the first field value, a spiral phase constraint and an aperture constraint.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The below described and other features of this disclosure will become more fully apparent from the following descripits scope, the disclosure will be described with additional specificity and detail through use of the accompanying drawings, in which.

Figure 1:
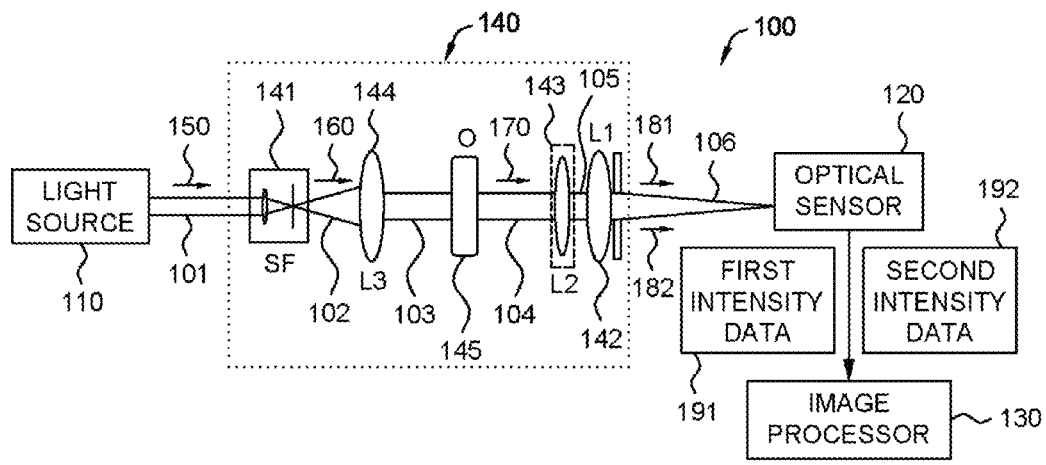
FIG. 1 is a schematic diagram illustrating an example system configured to determine phase data of an optical signal.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques for determining phase data of optical signals. The techniques may generally include determining phase data of the optical signal from two intensity measurements. An optical signal may be transmitted through a first optical element to obtain a first transmitted beam and first intensity data may be obtained for the first transmitted beam. The optical signal may also be transmitted through a second optical element to obtain a second transmitted beam and second intensity data may be obtained for the second transmitted beam. The phase data for the optical signal may be determined based on the first intensity data and the second intensity data. The various techniques described herein may provide high resolution images of objects, generated from the obtained intensity measurements. The techniques may facilitate detection of optical phase singularities used for a variety of applications such as optical metrology applications.

FIG. 1 is a schematic diagram illustrating an example system 100 configured to determine phase data of an optical signal, arranged in accordance with at least some embodiments of the present disclosure. The example system 100 may include one or more components such as a light source 110, an optical sensor 120, an image processor 130, and an optical assembly 140.

The optical assembly 140 may include various components, such as one or more of, a spatial filter (SF) 141, a first optical element (L1) 142, a second optical element (L2) 143, and a third optical element (L3) 144. Although the various components are illustrated as discrete blocks, the various blocks may be combined into fewer blocks, divided into additional blocks, and/or eliminated based upon the desired implementation.

The various components in system 100 can be configured as described below. Light source 110 may produce an output light beam 150 along a first optical path 101. The spatial filter (SF) 141 may be aligned along optical path 101. A second side of the spatial filter 141 is aligned along a second optical path 102, which is aligned with a first side of the third optical element (L3) 144. A second side of the third optical element (L3) 144 is aligned along a third optical path 103, which is aligned with a first side of an object (O) 145. A second side of the object (O) 145 is aligned along a fourth optical path 104, which is aligned with a first side of the second optical element (L2) 143.

A second side of the second optical element (L2) 143 is aligned along a fifth optical path 105, which is aligned with a first side of the first optical element (L1) 142. A second side of the first optical element 142 is aligned along a sixth optical path 106, which is aligned with an input of the optical sensor 120. The optical sensor 120 is coupled to the image processor 130. In some examples, the optical path 104 and the optical path 105 may have essentially zero path length such that the first optical element (L1) 142, the second optical element (L2) 143 and the object (O) 145 are in contact with each other.

In operation, the light source 110 may be configured to transmit (or project) the light beam 150 along the optical path 101 to the spatial filter (SF) 141. The spatial filter 141 may be configured to transmit a filtered beam 160 to the third optical element (L3) 144 along the optical path 102. The third optical element (L3) 144 may be configured to receive the filtered beam 160 and transmit the filtered beam 160 along the optical path 103. In this example, the third optical element (L3) 144 may facilitate generation of a collimated plane beam along the optical path 103. In some examples, irregularities in the light beam 150 may be substantially removed by the spatial filter (SF) 141 and the third optical element (L3) 144. The object (O) 145 may be positioned in the optical path 103, and illuminated by the filtered beam 160 to generate an optical signal 170. The optical signal 170 may be transmitted along the fourth optical path 104. The optical signal 170 is transmitted through the first optical element (L1) 142 along the optical path 105 to obtain a first transmitted beam 181. The optical sensor 120 may sense the first transmitted beam 181 to generate first intensity data 191. The optical sensor 120 may provide the first intensity data 191 to the image processor 130.

In some examples, the optical signal 170 may be transmitted through the second optical element (L2) 143, prior to transmitting through the first optical element (L1) 142. In these examples, the optical signal 170 may be transmitted through the first optical element (L1) 142 to obtain a second transmitted beam 182. The optical sensor 120 may sense the second transmitted beam 182 to generate second intensity data 192. The optical sensor 120 may provide the second intensity data 192 to the image processor 130.

The various components illustrated as part of the optical assembly 140, can be rearranged without departing from the spirit of the present disclosure. Additional mirrors, lenses, and filters may be employed throughout the system to facilitate an efficient or convenient physical orientation as may be desired in other implementations, while maintaining a substantially similar operational result.

As described above, the light source 110 may be configured to generate the light beam 150 that is transmitted through the object (O) 145 to generate the optical signal 170. In some examples, the light beam 150 from the light source 110 may be reflected from the object (O) 145 to generate the optical signal 170. In some examples, the optical signal 170 may be generated from an interaction of the light beam 150 with the object (O) 145. Examples of interaction of the light beam 150 with the object (O) 145 may include, but are not limited to, reflection, transmission, absorption, diffraction, scattering, nonlinear optical interaction, or combinations thereof.

Examples of light source 110 may include, but are not limited to, a laser source, a narrowband thermal source, a LED source, or combinations thereof. The light beam 150 may be a spatially coherent beam, for example such that there is a defined phase relationship between the light field at any two points in a plane perpendicular to the propagation direction. In one example, the phase of the light field at all points in the plane perpendicular to the propagation direction is substantially the same. The object (O) 145 may include a transparent object, a partially transparent object, a reflective object, a partially reflective object, or combinations thereof. As discussed above, the optical assembly 140 may be configured to transmit the optical signal 170 through the first optical element (L1) 142 to obtain the first transmitted beam 181. In one example, the first optical element (L1) 142 may include a lens with an aperture. Examples of lens include, but are not limited to, doubly convex lens, plano-convex lens, best form lens, aspheric lens, or combinations thereof. In some examples, curved mirrors, diffractive or holographic elements that are configured to facilitate focusing of the light beam may be used as the first optical element (L1) 142.

Further, the optical assembly 140 may be configured to transmit the optical signal 170 through the second optical element (L2) 143 to obtain the second transmitted beam 182. In the illustrated embodiment, the second optical element (L2) 143 may be a phase transformation mask. Examples of phase transformation mask may include, but are not limited to, a spiral phase transformation mask, a pseudo-random phase coded mask, a fork grating, or combinations thereof. Examples of the fork grating may include, but are not limited to, an amplitude fork grating, a phase fork grating, a binary amplitude-phase grating, a Dammann vortex phase grating, or combinations thereof.

In some examples, the optical signal 170 may be transmitted through the first optical element (L1) 142, without passing through the phase transformation mask 143 to obtain the first transmitted beam 181. In some examples, the second optical element (L2) 143 may be located such that the optical signal 170 may be transmitted through both the first optical element (L1) 142 and the second optical element (L2) 143 to obtain the second transmitted beam 182. In these examples, the optical signal 170 may be transmitted through a lens and the phase transformation mask to obtain the second transmitted beam 182. In some examples, the phase transformation mask may be placed proximate the aperture of the lens.

As illustrated in FIG. 1, the light beam 150 from the light source 110 may optionally be passed through the spatial filter 141 of the optical assembly 140. The spatial filter 141 may be effective to remove aberrations in the beam 150 and generate the filtered beam 160. The third optical element (L3) 144 placed between the light source 110 and the object (O) 145 may be configured to direct the filtered beam 160 towards the object (O) 145. In some examples, the third optical element (L3) 144 may include a lens.

In some examples, the optical sensor 120 may be placed in a first focal plane of the first optical element (L1) 142. The optical sensor 120 may be configured to obtain first intensity data 191 and a second intensity data 192 at the first focal plane of the first optical element (L1) 142. The first intensity data 191 and the second intensity data 192 may correspond to the transmitted optical signal. Examples of the optical sensor 120 may include, but are not limited to, a complementary metal oxide semiconductor (CMOS) sensor, a charge coupled device (CCD) sensor, or combinations thereof.

Further, the image processor 130 of the system 100 may be configured to process the first intensity data 191 and the second intensity data 192 to determine phase data of the optical signal 170. In one example, an image of the object (O) 145 may be formed from the phase data. The image processor 130 may be configured to iteratively apply a spiral phase constraint and an aperture constraint to the first intensity data 191 and the second intensity data 192 to determine phase data of the optical signal 170. In some examples, the spiral phase constraint may correspond to the phase transformation mask 143 and the aperture constraint may correspond to an aperture size of the first optical element (L1) 142.

In some examples, the apparatus of FIG. 1 may be an imaging device that is configured to generate an image based on the determined phase data using computational processing. Examples of the imaging device may include, but are not limited to, a camera, a microscope, a telescope, or combinations thereof.

Figure 2:
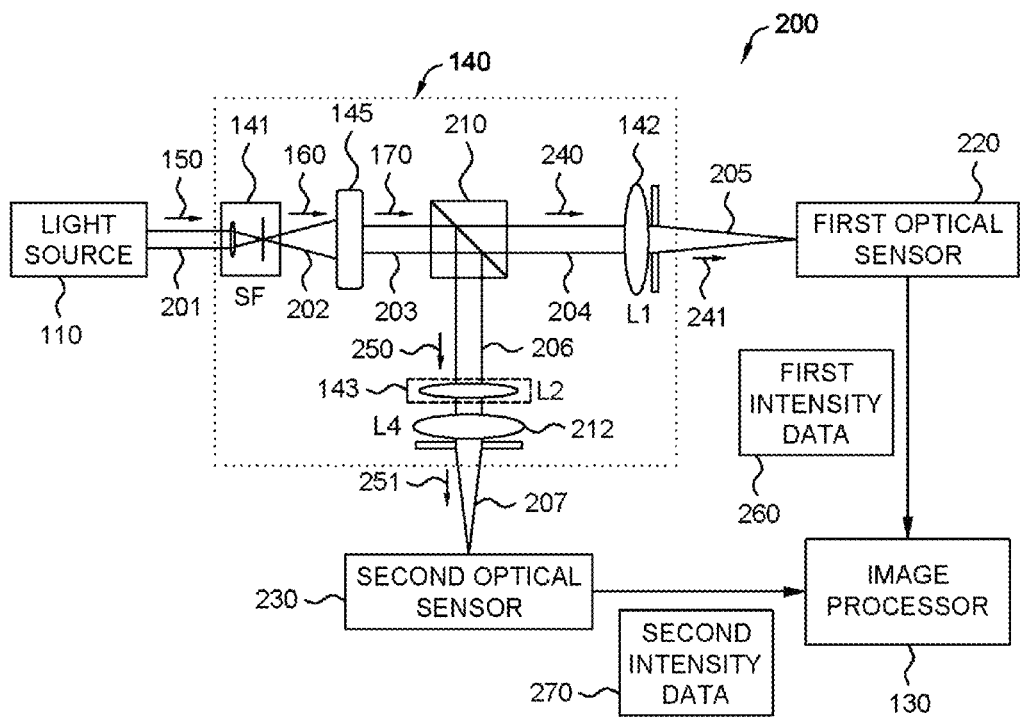
FIG. 2 is a schematic diagram illustrating another example configuration of a system to determine phase data of an optical signal.

FIG. 2 is a schematic diagram illustrating an example configuration 200 of an apparatus to determine phase data of an optical signal, arranged in accordance with at least some embodiments of the present disclosure. As with apparatus of FIG. 1, the apparatus 200 may include one or more components such as light source 110, the image processor 130, and the optical assembly 140. The example system 200 may include additional components such as a beam splitter (BS) 210, a first optical sensor 220 and a second optical sensor 230.

As described above, the light source 110 may be configured to generate the light beam 150 that is transmitted through the object (O) 145 to generate the optical signal 170. In some examples, the optical signal 170 may be generated from an interaction of the light beam 150 with the object (O) 145. In the illustrated embodiment, the beam splitter 210 may be configured to split the optical signal 170 into a first optical signal 240 and a second optical signal 250. The optical assembly 140 may be configured to transmit the first optical signal 240 through the first optical element (L1) 142 and to transmit the second optical signal 250 through the second optical element (L2) 143 to generate first intensity data 260 and the second intensity data 270 respectively. In this example, the second optical element (L2) 143 may be placed proximate a fourth optical element 212. In some examples, the fourth optical element (L4) 212 may be a lens. In this example, the second optical signal 250 may be transmitted through the second optical element (L2) 143 and the fourth optical element (L4) 212 to generate the second intensity data 270.

The various components in system 200 can be configured as follows below. The light source 110 includes an output aligned along a first optical path 201. The output from the light source 110 passes through a spatial filter (SF) 141. The spatial filter (SF) 141 is aligned along a second optical path 202, which is aligned with the first side of the object (O) 145. A second side of the object (O) 145 is aligned along the third optical path 203, which is aligned with a first side of the beam splitter (BS) 210. A first side of the beam splitter (BS) 210 is also aligned along a fourth optical path 204, which is aligned with a first side of the first optical element (L1) 142.

A second side of the first optical element (L1) 142 is aligned along a fifth optical path 205, which is aligned with the first optical sensor 220. A second side of the beam splitter (BS) 210 is aligned along a sixth optical path 206, which is aligned with a first side of the second optical element (L2) 143. A second side of the second optical element (L2) 143 is aligned along a seventh optical path 207, which is aligned with a first side of the fourth optical element (L4) 212, which in turn, is aligned with the second optical sensor 230. An output of the first-optical sensor 220 and the second optical sensor 230 may be coupled to the image processor 130.

In operation, the light source 110 may be configured to transmit (or project) the light beam 150 along the first optical path 201 to the spatial filter 141, which passes a filtered beam 160 to illuminate the object 145 positioned in the second optical path 202 to generate the optical signal 170. The optical signal 170 may be transmitted along the third optical path 203 to the first side of the beam splitter (BS) 210. The beam splitter 210 may be configured to split the optical signal 170 into the first optical signal 240 and the second optical signal 250.

The first optical signal 240 may be transmitted through the first optical element (L1) 142 to generate a first transmitted beam 241 and the second optical signal 250 may be transmitted through the second optical element (L2) 143 to generate a second transmitted beam 251. The first optical sensor 220 may be configured to obtain first intensity data 260 at the first focal plane of the first optical element (L1) 142 corresponding to the first transmitted beam 241.

The second optical sensor 230 may be configured to obtain second intensity data 270 at the second focal plane of the second optical element (L2) 143 corresponding to the second transmitted beam 251. In some embodiments, the first transmitted beam 241 and the second transmitted beam 251 may be received by a single sensor that is configured to obtain the first intensity data 260 and the second intensity data 270 based on the first transmitted beam 241 and the second transmitted beam 251.

Further, the image processor 130 of the system 200 may be configured to process the first intensity data 260 and the second intensity data 270 to determine phase data of the optical signal 170. The image processor 130 may be configured to iteratively apply a spiral phase constraint and an aperture constraint to the first intensity data 260 and the second intensity data 270 to determine phase data of the optical signal 170.

Figure 3:
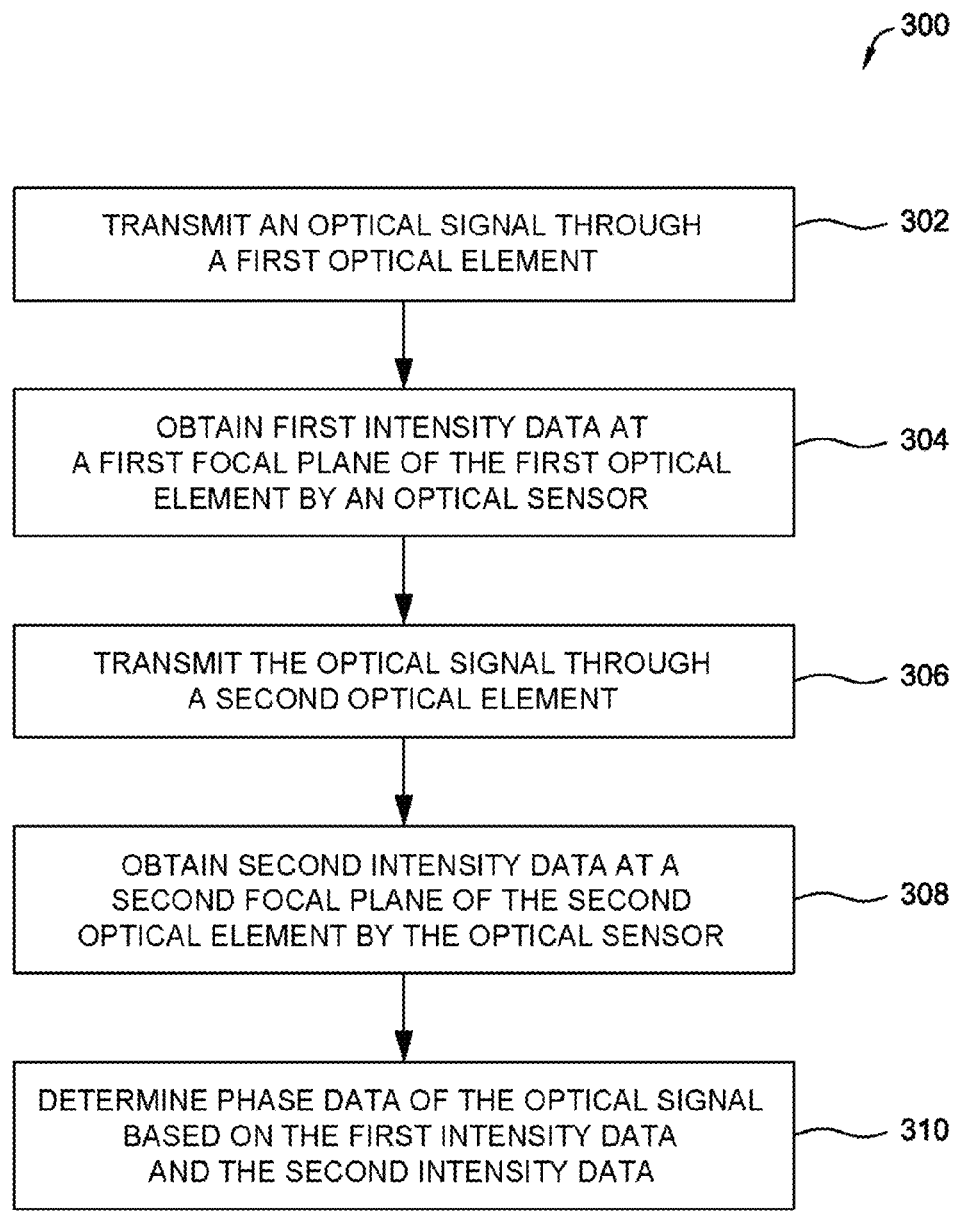
FIG. 3 is an illustration of an example process for determining phase data of an optical signal.

FIG. 3 is an illustration of an example process 300 to determine phase data of an optical signal, arranged in accordance with at least some embodiments described herein. Process 300 may include one or more operations, functions or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "TRANSMIT AN OPTICAL SIGNAL THROUGH A FIRST OPTICAL ELEMENT", an optical signal (170) may be transmitted through a first optical element (L1) (142). In some embodiments, a light beam (150) may be transmitted through an object (O) (145) to generate the optical signal (170). In certain embodiments, the light beam (150) generated from a light source (110) may be directed onto the object (O) (145) using a third optical element (L3) (144). In some embodiments, the light beam (150) may be reflected from the object (O) (145) to generate the optical signal (170). The optical signal (170) may be transmitted through the first optical element (L1) (142) to obtain a first transmitted beam (181).

Process 300 may continue from block 302 to block 304, "OBTAIN FIRST INTENSITY DATA AT A FIRST FOCAL PLANE OF THE FIRST OPTICAL ELEMENT BY AN OPTICAL SENSOR", where first intensity data (191) may be obtained at a first focal plane of the first optical element (L1) (142) by an optical sensor (120). In this example, the first intensity data (191) may correspond to the first transmitted beam (181).

Process 300 may continue from block 304 to block 306, "TRANSMIT THE OPTICAL SIGNAL THROUGH A SECOND OPTICAL ELEMENT", where the optical signal (170) may be transmitted through a second optical element (L2) (143). In this example, the second optical element (L2) (143) comprises a phase transformation mask. In this embodiment, the optical signal (170) may be passed through the phase transformation mask (143). In some examples, the second optical element (L2) (143) may be a phase transformation mask, which may be used with the first optical element (L1) (142) to transmit the optical signal (170) and to obtain a second transmitted beam 182. In some examples, the second optical element (L2) (143) may be a lens and phase transformation mask assembly that may replace the first optical element (L1) (142) to transmit the optical signal (170) and to obtain the second transmitted beam 182. In this example, the lens may have substantially similar optical characteristics as L1 142 (e.g. have the same aperture constraint, and/or the same focal length).

In some examples, the second optical element (L2) (143) may be placed proximate the first optical element (L1) (142), and the optical signal (170) may be transmitted through both the first optical element (L1) (142) and the second optical element (L2) (143). In one example, the second optical element (L2) (143) may be placed adjacent to an aperture of the first optical element (L1) (142). In some examples, a ray of light transmitted parallel to the optical axis of the first optical element (L1) 142 contacts the first optical element (L1) (142) and the second optical element (L2) (143) at substantially same distance/height from the optical axis.

Process 300 may continue from block 306 to block 308, "OBTAIN SECOND INTENSITY DATA AT A SECOND FOCAL PLANE OF THE SECOND OPTICAL ELEMENT BY THE OPTICAL SENSOR", where second intensity data (192) may be obtained at a second focal plane of the second optical element (L2) (143) by the optical sensor (120). In this example, the second intensity data (192) may correspond to the second transmitted beam (182).

Process 300 may continue from block 308 to block 310, "DETERMINE PHASE DATA OF THE OPTICAL SIGNAL BASED ON THE FIRST INTENSITY DATA AND THE SECOND INTENSITY DATA", where the phase data of the optical signal (170) may be determined based on the first intensity data (191) and the second intensity data (192) by an image processor (130). In some examples, the image processor (130) may iteratively apply a spiral phase constraint and an aperture constraint to the first intensity data (191) and the second intensity data (192) to determine the phase data of the optical signal (170). The spiral phase constraint may correspond to the phase transformation mask (143) and the aperture constraint may correspond to the first optical element (L1) (142). The determination of the phase data based on the first intensity data (191) and the second intensity data (192) will be described below with reference to FIG. 4.

Figure 4:
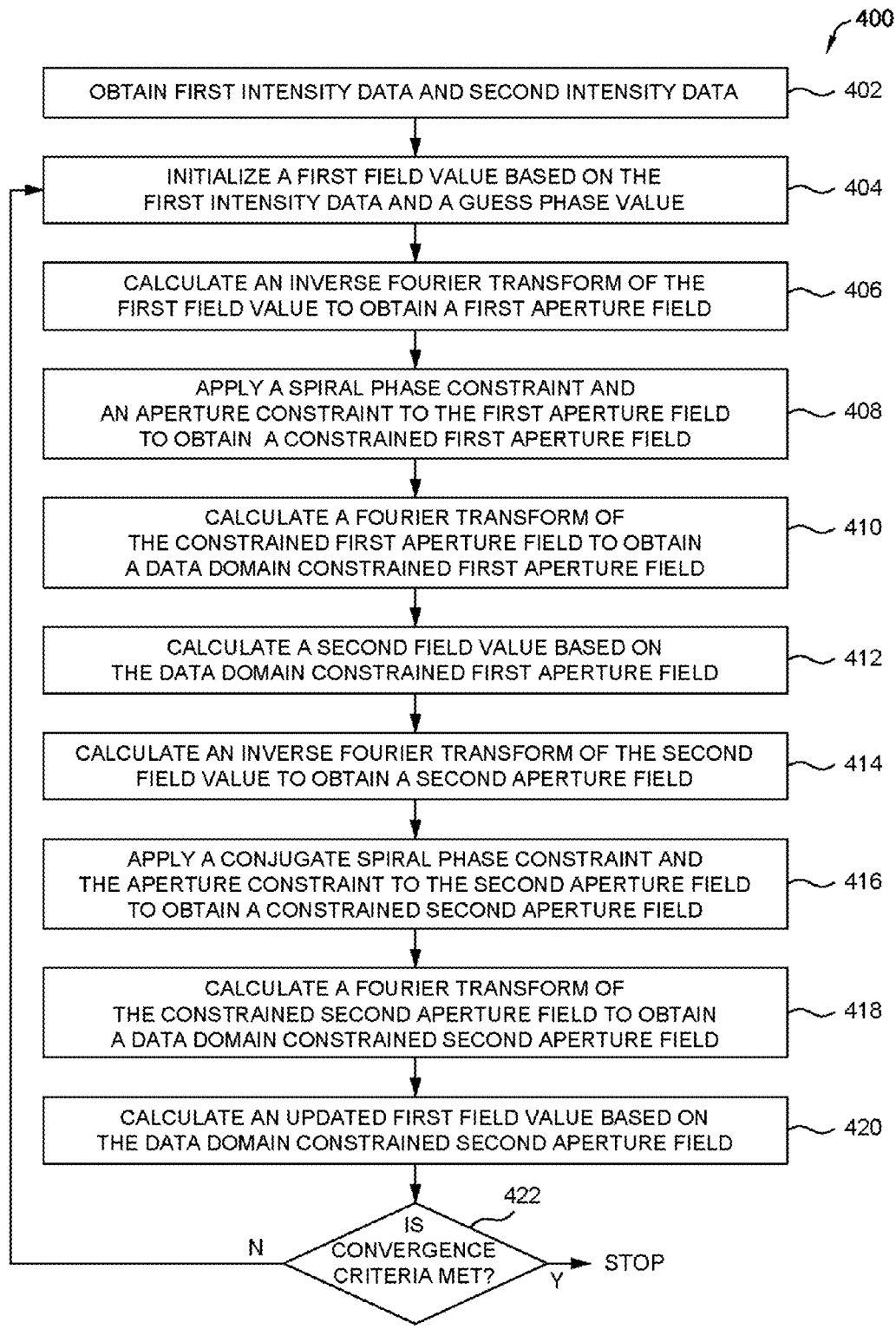
FIG. 4 is an illustration of an example process for determining phase data of an optical signal using measured intensity data.

FIG. 4 is an illustration of an example process 400 to determine a phase data of an optical signal, arranged in accordance with at least some embodiments described herein. Process 400 may include one or more operations, functions or actions as illustrated by one or more of blocks 402-422. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 400 may begin at block 402.

At block 402, "OBTAIN FIRST INTENSITY DATA AND SECOND INTENSITY DATA", first intensity data ($I_1$) (191) and second intensity data (12) (192) corresponding to the optical signal (170) may be obtained. The first intensity data (191) may be generated by an optical sensor (120) based on transmission of an optical signal (170) through an object (O) (145) and a first optical element (L1) (142). Further, the second intensity data (192) may be generated by the optical sensor (120) based on transmission of the optical signal through the object (O) (145) and a second optical element (L2) (143). In some embodiments, the second optical element (L2) (143) may include a phase transformation mask.

Process 400 may continue from block 402 to block 404, "INITIALIZE A FIRST FIELD VALUE BASED ON THE FIRST INTENSITY DATA AND A GUESS PHASE VALUE", where a first field value ($A_1^{(0)}(\rho,\varphi)$) may be initialized based on the first intensity data ($I_1$) (191) and a guess phase value ($\psi_1^{(0)}(\rho,\varphi)$). In some examples, the guess phase value may be a random value or a pre-determined value. For example, a random value generator may be used to assign random phase values to the guess phase value. In some examples, the assigned random phase values are in range of 0 to about $2\pi$. In some examples, the first field value ($A_1^{(0)}(\rho,\varphi)$) may be determined based on the first intensity data ($I_1$) (191) and the guess phase value ($\theta_1^{(0)}$) in accordance with the following relationship:

$$(A_1^{(0)}(\rho,\varphi) = \sqrt{I_1(\rho,\varphi)} \exp[i\Psi_1^{(0)}(\rho,\varphi)] \quad (1)$$

As will be described below, the first field value may be determined using an iterative process. In some examples, the first field value for $n^{th}$ iteration of the process is determined based on the value of previous iterations in accordance with the following relationship:

$$(A_1^{(n-1)}(\rho,\varphi) = \sqrt{I_1(\rho,\varphi)} \exp[i\Psi_1^{(n-1)}(\rho,\varphi)] \quad (2)$$

Process 400 may continue from block 404 to block 406, "CALCULATE AN INVERSE FOURIER TRANSFORM OF THE FIRST FIELD VALUE TO OBTAIN A FIRST APERTURE FIELD", where an inverse Fourier transform of the first field value ($A_1^{(n-1)}(\rho,\varphi)$) may be calculated to obtain a first aperture field ($\alpha_1^{(n-1)}(r,\theta)$).

Process 400 may continue from block 406 to block 408, "APPLY A SPIRAL PHASE CONSTRAINT AND AN APERTURE CONSTRAINT TO THE FIRST APERTURE FIELD TO OBTAIN A CONSTRAINED FIRST APERTURE FIELD", where a spiral phase constraint ($\exp(i\theta)$) and an aperture constraint ($C(r,\theta)$) may be applied to the first aperture field ($\alpha_1^{(n-1)}(r,\theta)$) to obtain a constrained first aperture field ($\alpha_2^{(n-1)}(r,\theta)$). In some examples, the first aperture field ($\alpha_1^{(n-1)}(r,\theta)$) may be multiplied by the spiral phase constraint ($\exp(i\theta)$) and the aperture constraint ($C(r,\theta)$) to obtain the constrained first aperture field ($\alpha_2^{(n-1)}(r,\theta)$). In some examples, value of the aperture constraint is set to "1" within an aperture area. In some examples, the value of the aperture constraint is set to "0" outside an aperture area. As used herein, the term "within an aperture area" refers to a transmitting portion of the phase transformation mask and the term "outside an aperture area" refers to a non-transmitting portion of the phase transformation mask.

Process 400 may continue from block 408 to block 410, "CALCULATE A FOURIER TRANSFORM OF THE CONSTRAINED FIRST APERTURE FIELD TO OBTAIN A DATA DOMAIN CONSTRAINED FIRST APERTURE FIELD" where a Fourier transform of the constrained first aperture field ($\alpha_2^{(n-1)}(r,\theta)$) may be calculated to obtain a data domain constrained first aperture field ($B_2^{(n)}(\rho,\varphi)$). In this example, the data domain constrained first aperture field ($B_2^{(n)}(\rho,\varphi)$) may include a first phase component.

Process 400 may continue from block 410 to block 412, "CALCULATE A SECOND FIELD VALUE BASED ON THE DATA DOMAIN CONSTRAINED FIRST APERTURE FIELD", where a second phase function ($\Psi_2^{(n)}(\rho,\varphi)$) may be calculated based on the data domain constrained first aperture field ($B_2^{(n)}(\rho,\varphi)$) in accordance with the following relationship:

$$(\Psi_2^{(n)}(\rho,\varphi) = \arg[B_2^{(n)}(\rho,\varphi)] \quad (3)$$

Further, a second field value ($A_2^{(n)}(\rho,\varphi)$) may be calculated based on the data domain constrained first aperture field ($B_2^{(n)}(\rho,\varphi)$) and the second intensity data ($I_2$) (192) in accordance with the following relationship:

$$(A_2^{(n)}(\rho,\varphi) = \sqrt{I_2(\rho,\varphi)} \exp[i\Psi_2^{(n)}(\rho,\varphi)] \quad (4)$$

Process 400 may continue from block 412 to block 414, "CALCULATE AN INVERSE FOURIER TRANSFORM OF THE SECOND FIELD VALUE TO OBTAIN A SECOND APERTURE FIELD", where an inverse Fourier transform of the second field value ($A_2^{(n)}(\rho,\varphi)$) may be calculated to obtain a second aperture field ($\alpha_2^{(n)}(\rho,\theta)$).

Process 400 may continue from block 414 to block 416, "APPLY A CONJUGATE SPIRAL PHASE CONSTRAINT AND THE APERTURE CONSTRAINT TO THE SECOND APERTURE FIELD TO OBTAIN A CONSTRAINED SECOND APERTURE FIELD", where a conjugate spiral phase constraint ($\exp(-i\theta)$) and the aperture constraint $C(r,\theta)$ may be applied to the second aperture field ($\alpha_2^{(n)}(r,\theta)$) to obtain a constrained second aperture field ($\alpha_1^{(n)}(r,\theta)$). In some examples, the second aperture field ($\alpha_2^{(n)}(r,\theta)$) may be multiplied by the conjugate spiral phase constraint ($\exp(-i\theta)$) and the aperture constraint ($C(r,\theta)$) to obtain the constrained second aperture field ($\alpha_1^{(n)}(r,\theta)$).

Process 400 may continue from block 416 to block 418, "CALCULATE A FOURIER TRANSFORM OF THE CONSTRAINED SECOND APERTURE FIELD TO OBTAIN A DATA DOMAIN CONSTRAINED SECOND APERTURE FIELD", where a Fourier transform of the constrained second aperture field ($\alpha_1^{(m)}(r,\theta)$) may be calculated to obtain a data domain constrained second aperture field ($B_1^{(m)}(\rho,\varphi)$).

Process 400 may continue from block 418 to block 420, "CALCULATE AN UPDATED FIRST FIELD VALUE BASED ON THE DATA DOMAIN CONSTRAINED SECOND APERTURE FIELD", where an updated first field value ($A_1^{(m)}(\rho,\varphi)$) may be calculated based on the data domain constrained second aperture field ($B_1^{(m)}(\rho,\varphi)$). In some examples, the updated first field value ($A_1^{(m)}(\rho,\varphi)$) may be calculated based on the data domain constrained second aperture field ($B_1^{(m)}(\rho,\varphi)$) in accordance with the following relationship:

$$(\Psi_1^{(m)}(\rho,\varphi) = \arg[B_1^{(m)}(\rho,\varphi)] \tag{5}$$

$$(A_1^{(m)}(\rho,\varphi) = \sqrt{I_1(\rho,\varphi)} \exp[i\Psi_1^{(m)}] \tag{6}$$

In some examples, an amplitude component of the updated first field value ($A_1^{(m)}(\rho,\varphi)$) may be based on the first intensity data ($I_1$) (191).

Process 400 may continue from block 420 to block 422, "IS CONVERGENCE CRITERIA MET?", where the updated first field value ($A_1^{(m)}(\rho,\varphi)$) may be compared with the first field value ($A_1^{(n-1)}(\rho,\varphi)$). In some examples, a convergence criteria may include comparison of a difference value based on the first field value ($A_1^{(n-1)}(\rho,\varphi)$) and the updated first field value ($A_1^{(m)}(\rho,\varphi)$) and a threshold. In some examples, the convergence criteria may include an upper limit for number of iterations and/or computation time.

If the convergence criteria are met, then the updated first field value ($A_1^{(m)}(\rho,\varphi)$) may be determined as a converged first field value and the phase data of the optical signal may be determined based on the converged first field value. Alternately, if the convergence criteria are not met then the first field value ($A_1^{(n-1)}(\rho,\varphi)$) may be iteratively updated by applying the spiral phase constraint (exp(i$\theta$)) and the aperture constraint C(r,$\theta$) to the first and second intensity data until a converged value is obtained. In each iteration, the first field value ($A_1^{(n-1)}(\rho,\varphi)$) may be replaced by the updated first field value ($A_1^{(m)}(\rho,\varphi)$). In some examples, the converged first field value ($A_1^{(m)}(\rho,\varphi)$) may be inverted to determine the phase data of the optical signal (170).

Figure 5:
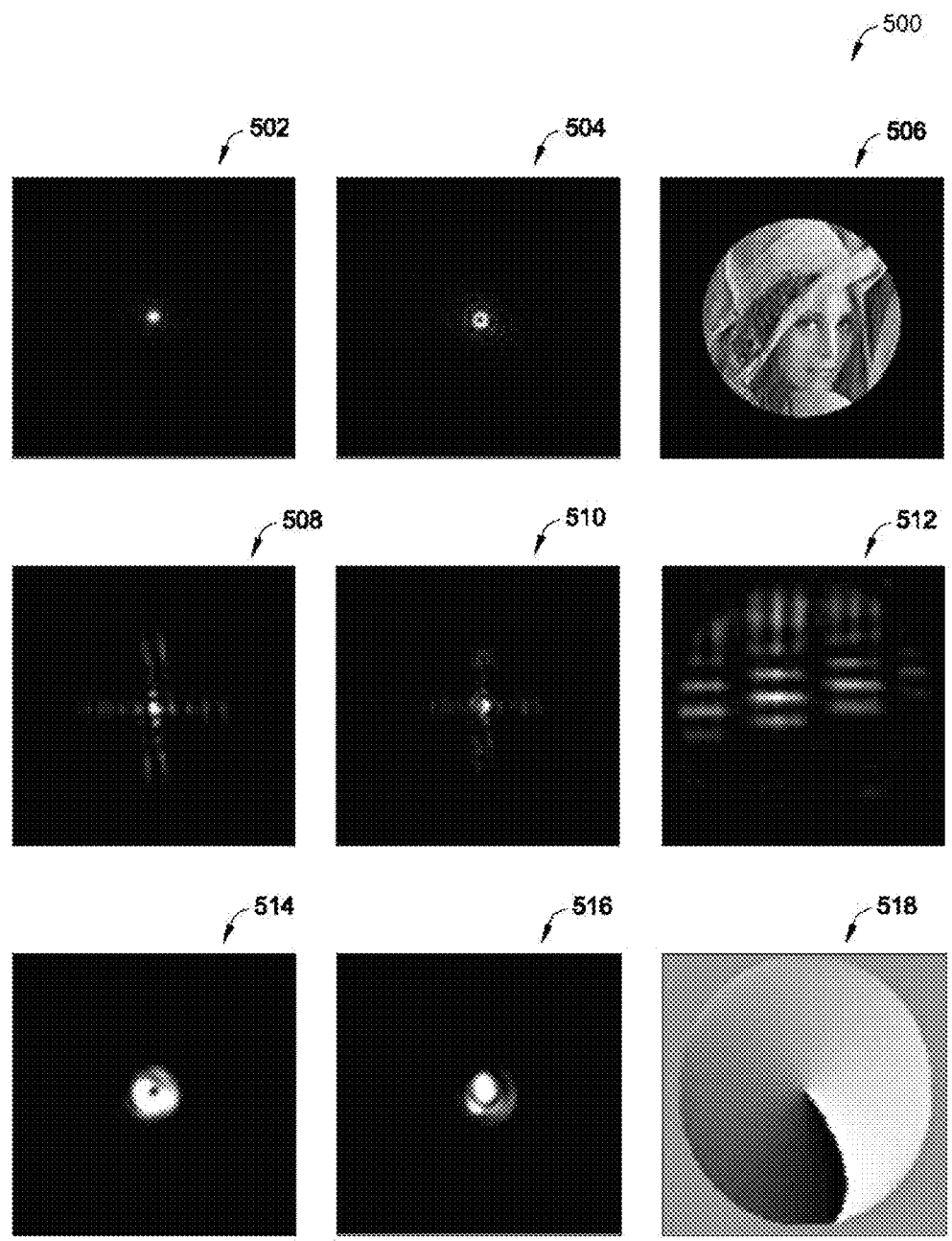
FIG. 5 illustrates intensity measurements and recovered images using the apparatus of FIG. 1.

FIG. 5 illustrates example images 500 of intensity measurements and images recovered using an apparatus such as the apparatus of FIG. 1, arranged in accordance with at least some aspects described herein. In this example, images 502, 504, and 506 correspond to recovery of a Lena image. The images 502, 504 and 506 are obtained by simulation using the example process of FIG. 3. Further, images 508, 510, 512 correspond to recovery of a portion of a bar chart and images 514, 516, 518 correspond to recovery of a spiral phase obtained using the present technique. The images 508, 510, 512, 514, 516 and 518 are obtained using an experimental system such as illustrated in FIG. 1.

Here, images 502, 508 and 514 represent the measured first intensity data corresponding to a signal transmitted through a lens. Further, images 504, 510 and 516 represent the measured second intensity data corresponding to a signal transmitted through a spiral transformation mask placed proximate the lens. Moreover, images 506, 512, 518 represent recovered images based on the first intensity data and the second intensity data using the present technique. In this example, the amplitude values are shown in the images 506 and 512 corresponding to amplitude objects. Further, phase values are shown in the image 518 corresponding to a transparent phase object.

The images recovered from such measured intensity data using techniques of the present disclosure are represented by reference numerals 506, 512, 518. As described above, the phase data for the images 506, 512 and 518 is determined by iteratively applying a spiral phase constraint and an aperture constraint to the measured intensity data. In this example, the phase data is obtained with number of iterations in the range of about 10 to about 50.

Figure 6:
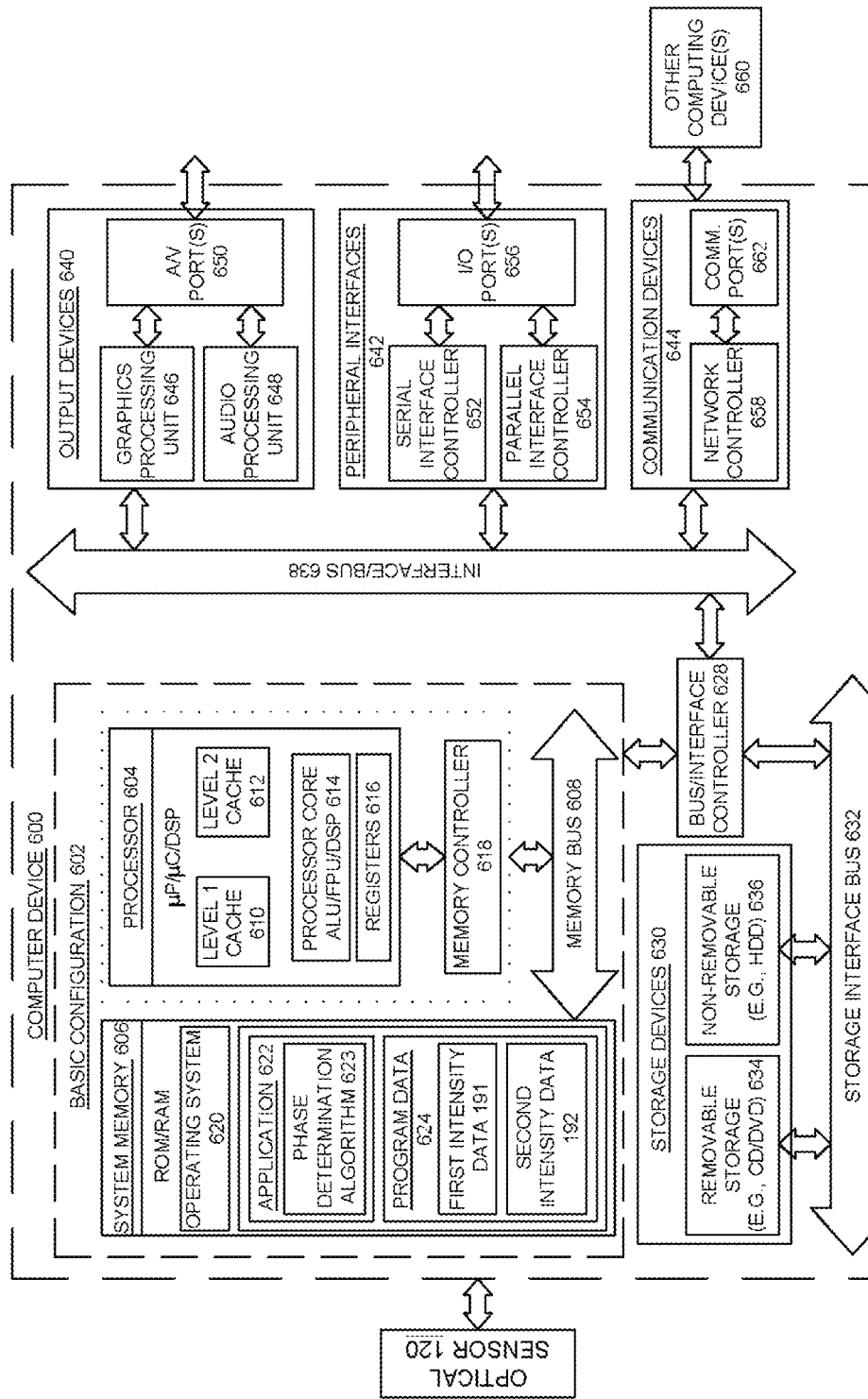
FIG. 6 is illustrates a general purpose computing device, which may be used to determine phase data of an optical signal.

Example Computing Device: FIG. 6 is a block diagram illustrating an example computing device 600 that is arranged to determine phase data of an optical signal, in accordance with at least some embodiments of the present disclosure. In a very basic configuration 602, the computing device 600 typically includes one or more processors 604 and a system memory 606. A memory bus 608 may be used for communicating between processor 604 and system memory 606.

Depending on the desired configuration, processor 604 may be of any type including but not limited to a microprocessor ($\mu$P), a microcontroller ($\mu$C), a digital signal processor (DSP), or any combination thereof. Processor 604 may include one more levels of caching, such as a level one cache 610 and a level two cache 612, one or more processor cores 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a phase determination algorithm 623 that is arranged to perform the functions as described herein including those described with respect to process 100 of FIG. 1.

Program data 624 may include first intensity data 191 and second intensity data 192 received from an optical sensor 120 that may be useful for determining the phase data of the optical signal. In some examples, application 622 may be arranged to operate with program data 624 on the operating system 620 such that phase determination of the optical signal may be performed. In some examples, the phase determination algorithm 623 may be configured to apply a spiral phase constraint and an aperture constraint to the first intensity data 191 and the second intensity data 192 to determine the phase data of the optical signal. In some examples, the spiral phase constraint may correspond to a phase transformation mask and the aperture constraint may correspond to a first optical element. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 628 may be used to facilitate communications between basic configuration 602 and one or more data storage devices 630 via a storage interface bus 632. Data storage devices 630 may be removable storage devices 634, non-removable storage devices 636, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 634 and non-removable storage devices 636 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 638 for facilitating communication from various interface devices (e.g., output devices 640, peripheral interfaces 642, and communication devices 644) to basic configuration 602 via bus/interface controller 628. Example output devices 640 include a graphics processing unit 646 and an audio processing unit 648, which may be configured to communicate to various external devices such as a display or speakers via one or more A/V ports 650.

Example peripheral interfaces 642 include a serial interface controller 652 or a parallel interface controller 654, which may be configured to communicate with external devices such as input devices (e.g., keyboard, mouse, pen, voice input device, touch input device, etc.) or other peripheral devices (e.g., printer, scanner, etc.) via one or more I/O ports 656. An example communication device 644 includes a network controller 658, which may be arranged to facilitate communications with one or more other computing devices 660 over a network communication link via one or more communication ports 662.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The example embodiments described above provides non-interferometric techniques for determining phase data of optical signals. The apparatus for phase measurement facilitates high resolution image recovery based on measured intensity data. The technique facilitates dynamic phase measurement using a simple and robust design set-up. The apparatus for determining the phase information described above is relatively insensitive to vibrations compared to the conventional interference based systems. The present technique may be used for phase measurement in a variety of applications such as biosciences, optical metrology applications, defense applications, 3D display applications, biometrics, and laser beam shaping applications, among others.

Figure 7:
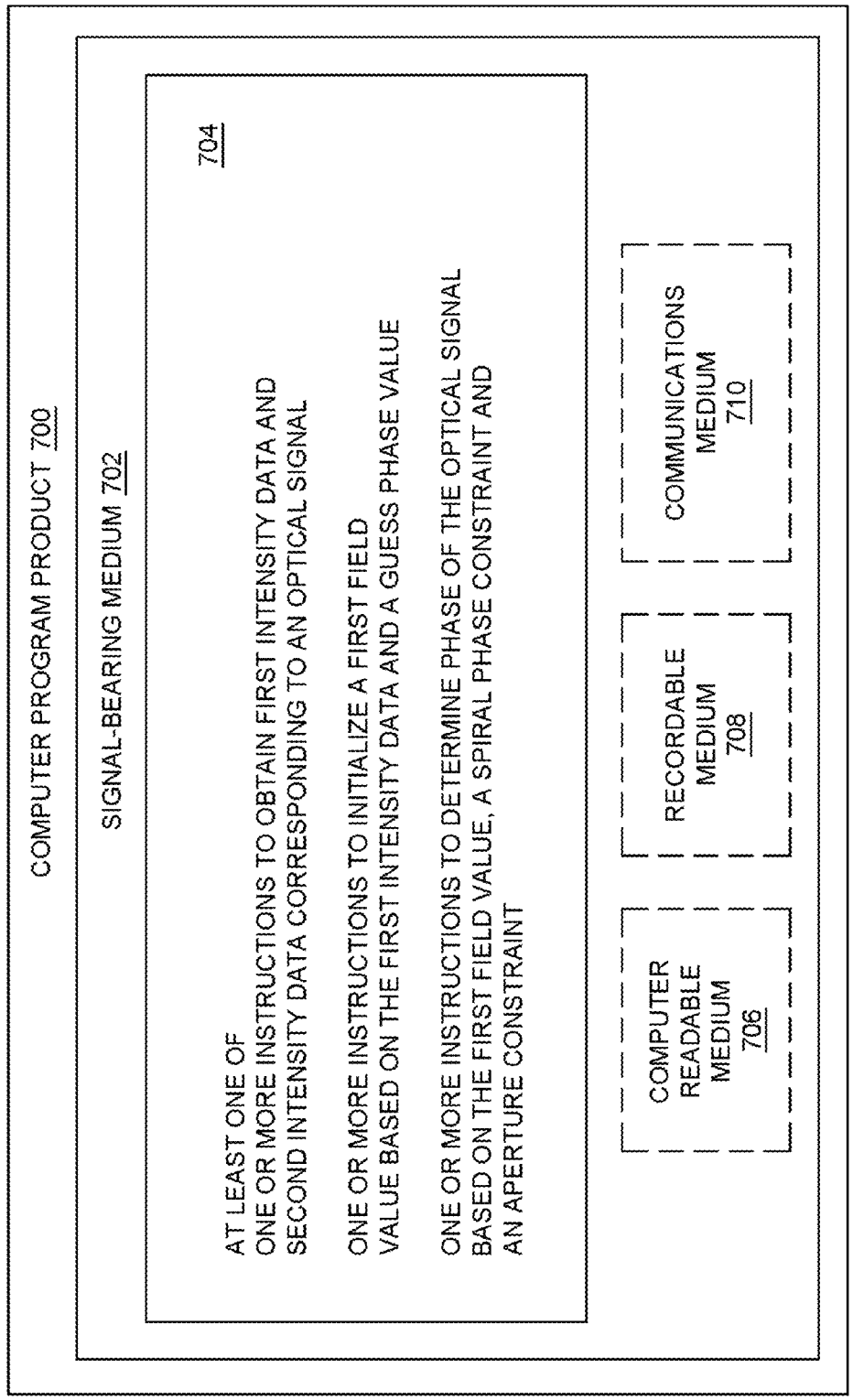
FIG. 7 is an example computer program product to implement phase determination.

FIG. 7 illustrates an example computer program product that can be utilized to implement phase determination in computer systems, arranged in accordance with at least some embodiments described herein. Program product 700 may include a signal bearing medium 702. Signal bearing medium 702 may include one or more instructions 704 that, in response to execution by, for example, a processor may provide the features described above with respect to FIGS. 1-6. Thus, for example, referring to system 100, image processor 130 may undertake or cause to be undertaken the operations depicted in one or more of the blocks shown in FIG. 7 in response to instructions 704 conveyed to the system 100 by medium 702 and then executed.

In some implementations, signal bearing medium 702 may encompass a non-transitory computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of the system 100 by an RF signal bearing medium 702, where the signal bearing medium 702 is conveyed by a wireless communications medium 710 (e.g., a wireless communications medium conforming with the IEEE 802.11 standard).

In some examples, a method of determining phase data for an optical signal comprises transmitting the optical signal through a first optical element, such as a lens, and obtaining first intensity data, for example by an optical sensor which may be located, for example, at a focal plane of the first optical element. The method may further include transmitting the optical signal through a second optical element and obtaining second intensity data, for example using the same or a different optical sensor, which may be located, for example, at a focal plane of the second optical element (or a focal plane of the combination of the first and second elements). In some examples, the second optical element comprises a phase transformation mask, such as a spiral phase transformation mask. Phase data for the optical signal may be obtained based on the first intensity data and the second intensity data. In some examples, the first intensity data may be obtained after transmitting the optical signal through the first optical element and not through the second optical element. In some examples, the second intensity data may be obtained after transmitting the optical signal through both the first and second optical elements. In some examples, the second intensity data may be obtained after transmitting the optical signal through the second optical element and not through the first optical element. In some examples, a mirror may be used for the first optical element, the optical signal may be reflected from the first optical element, and the optical sensor may be located at a focal plane of the mirror. In some examples, phase data may be obtained from a plurality of collections of first and second intensity data, for example using averaging to improve accuracy.

In some examples, an optical signal may be generated by the interaction of a light beam and object, for example obtained by directing light (such as a light beam) at the object. Examples include transmitting a light beam through an object, reflecting a light beam from an object, to obtain the optical signal. In some examples, phase data determined for the optical signal may be used to form an image of the object. In some examples, a magnified image of an object may be obtained using the phase data. For example, one or more optical elements may be used to converge the light beam to imaged region (which in some examples may be less than one square millimeter), to obtain phase data for the optical signal related to interactions of the light beam with one or more objects in the imaged region. In some examples, a method may be a method of imaging at least one object, which may be a macroscopic or microscopic object. In some examples, imaged objects may include optical elements, surfaces (such as mirrors, silicon wafers, and the like), particles (such as cells and the like), contaminants thereon, or other objects.

In some examples, methods and apparatus for measurement of the phase data for an optical signal, such as a coherent optical signal, include determining phase data computationally using two (or more) intensity measurements on the optical signal. For example, an optical signal with an unknown optical wavefront may be incident on a lens with a given aperture (for example, a circular aperture) and first intensity data for the optical signal is determined at the rear focal plane of the lens, for example using an optical sensor. Second intensity data may be obtained using a phase mask, such as a spiral phase mask. For example, the phase mask may be placed in the path of the optical signal, for example proximate the lens. In some examples, the phase mask may partially, substantially, or completely fill the aperture of the lens. The two intensity measurements may be performed sequentially, or in some examples may be performed in parallel, for example using a beam-splitter to obtain split the optical signal. In some examples, an iterative approach may be used to obtain a determination of phase data for the input wavefront of the optical signal using the two intensity measurements. In some examples, a mirror may be used in place of the lens.

In some examples, an apparatus may be (or include) an imaging device, such as a microscope (for example, a phase contrast microscope), or an imaging device such as a camera, video camera and the like. In some examples, example methods and/or apparatus may include microscopy, for example a bio-imaging microscope configured for transparent cell imaging. For example, an advantage may be that staining may not be required for phase data measurements. In some examples, in-vitro imaging may be possible, for example of the eye (e.g. the retina). Example applications may include optical metrology and profilometry, for example non-contact determination of a surface profile.

Example apparatus may include telescopes and other imaging devices, for example to obtain improved adaptive wavefront correction of incident light. Example apparatus may include imaging systems, and non-interferometric techniques can be used to obtain phase data using intensity measurements. Techniques may use a direct or iterative numerical solution for phase estimation, in some examples using known constraints on the object/image to be recovered. Other approaches may use techniques based on transport of intensity equation (TIE). An improved adaptive imaging device (such as an adaptive telescope) may include a controller configured to receive the phase data obtained for an optical signal derived from the incident light, and further configured to adaptively modify the incident light to obtain a more uniform wavefront in the optical signal.

Example applications may further include laser beam shaping, such as high power laser beam shaping, for example for improved laser cutting/welding apparatus or other high power laser applications. For example, an apparatus may include a controller configured to receive the phase data, and further configured to adaptively modify an input laser beam to obtain a desired (for example, a more uniform) wavefront in the laser beam. In some examples, the light beam may pass through a partially reflecting element and the optical signal obtained as a portion of the light beam. Determined phase data for the optical signal may then be used to adaptively control the phase (e.g. wavefront profile) of the light beam.

In some examples, applications may include methods and apparatus for the determination and correction of thermooptical effects, for example caused by a high intensity laser beam in one or more optical elements. A controller may be configured to obtain phase data from the optical signal and adaptively control correction optics to improve beam quality, for example to improve the focus of a light beam such as a laser beam. In some examples, phase data determinations may be made in near real time, and appropriate correction (for example, using a phase correction element such as a spatial light modulator, electrooptical element, and the like) may be used to obtain a desired light beam wavefront profile, is required.

Example applications may include vision evaluation and eye defect measurement. An improved method of eye metrology may include determining one or more eye aberrations using the phase data for an optical signal. An optical signal may be obtained by reflecting a light beam from the back of the eye and out of the eye to obtain the optical signal. The phase data for the optical signal may convey information about the aberrations of the lens and/or cornea, allowing corrective optics to be determined with improved speed and accuracy. Examples may also include an improved retinal imaging device, for example to allow improved diagnosis of medical conditions that may present themselves through retinal imaging, and improved laser focusing for laser keratotomy.

Example applications may further include apparatus and methods for evaluating a surface, for example detecting liquid films or other contaminants on a substrate, evaluating surface roughness, and the like. Example applications may include evaluating films, such as determining film thickness, film uniformity (e.g. thickness and/or compositional non-uniformity may be determined from the phase data for the optical signal). Example applications may include detecting contaminants (for example, on a substrate, on or in an optical element, and the like). Example applications may include detecting particulates (such as liquid particles), pollutants, fluid flow, and other applications. Example applications may include detection of analytes, cytology, and the like.

In some examples, the phase data may be determined at intervals and used to form dynamic images of an object, for example to obtain time-dependent information on physical, chemical, biochemical, and/or biological processes. In some examples, information obtained from the time-dependent phase data may be used for dynamic process control.

In some examples, a method to determine phase data of an optical signal comprises transmitting the optical signal through a first optical element, obtaining first intensity data at a first focal plane of the first optical element by an optical sensor, transmitting the optical signal through a second optical element, obtaining second intensity data at a second focal plane of the second optical element by the optical sensor, and determining phase data for the optical signal based on the first intensity data and the second intensity data. The second optical element may comprise a phase transformation mask. Determining phase data of an optical signal may further comprise transmitting a light beam onto or through an object to generate the optical signal. Transmitting the light beam may further comprise directing the light beam onto or through the object using a third optical element. A light beam may be reflected from, diffracted by, or otherwise interact with an object to generate the optical signal. Transmitting the optical signal through the second optical element may comprise passing the optical signal through a phase transformation mask, such as a spiral phase transformation mask. Transmitting the optical signal through the second optical element may comprise placing the second optical element proximate, substantially adjacent, or adjacent the first optical element, and transmitting the optical signal through both the first optical element and the second optical element. The first and second optical element may be physically combined. Transmitting the optical signal through the second optical element may comprise placing the second optical element adjacent to an aperture of the first optical element. Determining phase data of the optical signal may comprise iteratively applying a spiral phase constraint and an aperture constraint to the first intensity data and the second intensity data to determine the phase data of the optical signal, wherein the spiral phase constraint corresponds to the phase transformation mask and the aperture constraint corresponds to the first optical element. Iteratively applying the spiral phase constraint and the aperture constraint may comprise: determining a first field value based on the first intensity data and a guess phase value; calculating an inverse Fourier transform of the first field value to obtain a first aperture field; applying the spiral phase constraint and the aperture constraint to the first aperture field to obtain a constrained first aperture field; calculating a Fourier transform of the constrained first aperture field to obtain a data domain constrained first aperture field, wherein the data domain constrained first aperture field has a first phase component; and calculating a second field value based on the data domain constrained first aperture field, wherein an amplitude component of the second field value is based on the second intensity data and a phase component of the second field value is equal to the first phase component. Iteratively applying the spiral phase constraint and the aperture constraint may comprise: calculating an inverse Fourier transform of the second field value to obtain a second aperture field; applying a conjugate spiral phase constraint and the aperture constraint to the second aperture field to obtain a constrained second aperture field; calculating a Fourier transform of the constrained second aperture field to obtain a data domain constrained second aperture field, wherein the data domain constrained second aperture field has a second phase component; and calculating an updated first field value based on the data domain constrained second aperture field, wherein an amplitude component of the updated first field value is based on the first intensity data and a phase component of the updated first field value is equal to the second phase component. Calculating the updated first field value may comprise comparing the updated first field value with the first field value and updating the first field value by applying the spiral constraint and the aperture constraint until a converged value of the first field value function obtained, and optionally determining the phase of the optical signal based on the converged value of the first field value. A non-transitory computer readable medium may have computer-executable instructions stored thereon that are executable by a processor may be configured to perform or cause to be performed example methods to determine phase data of an optical signal.

In some examples, an apparatus configured to determine phase data of an optical signal comprises: an optical assembly comprising a first optical element and a second optical element, wherein the second optical element comprises a phase transformation mask and wherein the optical assembly is configured to transmit the optical signal through the first optical element and the second optical element; and an optical sensor placed in a first focal plane of the first optical element and in a second focal plane of the second optical element, wherein the optical sensor is configured to obtain first intensity data at the first focal plane of the first optical element and to obtain second intensity data at the second focal plane of the second optical element and wherein the first intensity data and the second intensity data correspond to the transmitted optical signal; and optionally an image processor coupled to the optical sensor, wherein the image processor is configured to process the first intensity data and the second intensity data to determine phase data of the optical signal. The optical assembly may further comprise a light source, such as a laser, configured to generate a light beam that is transmitted through an object to generate the optical signal. The light beam from the light source is reflected from the object to generate the optical signal. The object may be or comprise a transparent object, a partially transparent object, a reflective object, or combinations thereof. The light source may comprise a laser source, a collimated narrowband thermal source, a light-emitting diode (LED) source, or combinations thereof. The optical assembly may further comprise a spatial filter and/or a third optical element placed between the light source and the object, wherein the spatial filter is configured to filter the light beam to generate a filtered beam and the third optical element is configured to direct the filtered beam towards the object. The first optical element may comprise a lens, a concave mirror, a convex mirror, or combinations thereof. The first optical element may comprise an aperture, for example an aperture plate defining an aperture therein. The optical sensor may comprise a complementary metal oxide semiconductor (CMOS) sensor, a charge coupled device (CCD) sensor, other electronic sensor, a photographic film, or combinations thereof. The phase transformation mask may comprise a spiral phase transformation mask, a pseudo-random phase coded mask, or combinations thereof. The second optical element may comprise a fork grating and a lens. A fork grating, if used, may comprise an amplitude fork grating, a phase fork grating, a binary amplitude-phase grating, a Dammann vortex phase grating, or a combination thereof. The image processor may be configured to iteratively apply a spiral phase constraint and an aperture constraint to the first intensity data and the second intensity data to determine phase of the optical signal, wherein the spiral phase constraint corresponds to the phase transformation mask and the aperture constraint corresponds to the first optical element. The optical assembly may further comprise a beam splitter configured to split the optical signal into a first optical signal and a second optical signal, wherein the optical assembly is configured to transmit the first optical signal through the first optical element and to transmit the second optical signal through the second optical element to generate the first intensity data and the second intensity data. The apparatus is may be (or comprise) an imaging device. An imaging device may comprise a camera, a microscope, a telescope, or combinations thereof.

In some examples, a method to determine phase data of an optical signal comprises: obtaining first intensity data and second intensity data, wherein the first intensity data is generated by an optical sensor based on transmission of the optical signal through an object and a first optical element and the second intensity data is generated by the optical sensor based on transmission of the optical signal through the object and a second optical element, wherein the second optical element comprises a phase transformation mask; initializing a first field value based on the first intensity data and a guess phase value; and determining the phase data of the optical signal based on the first field value, a spiral phase constraint and an aperture constraint, wherein the spiral phase constraint corresponds to the phase transformation mask and the aperture constraint corresponds to the first optical element. Determining the phase data of the optical signal may comprise: calculating an inverse Fourier transform of the first field value to obtain a first aperture field; multiplying the first aperture field with the spiral phase constraint and the aperture constraint to obtain a constrained first aperture field; calculating a Fourier transform of the constrained first aperture field to obtain a data domain constrained first aperture field, wherein the data domain constrained first aperture field has a first phase component; and calculating a second field value based on the data domain constrained first aperture field, wherein an amplitude component of the second field value is based on the second intensity data and a phase component of the second field value is equal to the first phase component. Determining the phase data of the optical signal may further comprise: calculating an inverse Fourier transform of the second field value to obtain a second aperture field; multiplying the second aperture field with a conjugate spiral phase constraint and the aperture constraint to obtain a constrained second aperture field, calculating a Fourier transform of the a constrained second aperture field to obtain a data domain constrained second aperture field, wherein the data domain constrained second aperture field has a second phase component; and calculating an updated first field value based on the data domain constrained second aperture field, wherein an amplitude component of the updated first field value is based on the first intensity data and a phase component of the updated first field value is equal to the second phase component. Determining the phase data of the optical signal may comprise estimating a difference value based on the first field value and the updated first field value; comparing the difference value with a threshold; and iteratively calculating the updated first field value until a converged value of the first field value is obtained, and may further comprise inverting the updated first field value to determine the phase of the optical signal.

In some examples, a non-transitory computer readable medium having computer-executable instructions stored thereon that are executable by a processor may be configured to perform or cause to be performed any method described or suggested herein.

In some examples, a method to determine phase data for an optical signal comprises transmitting the optical signal through a first optical element to obtain a first transmitted beam; obtaining first intensity data for the first transmitted beam; transmitting the optical signal through a second optical element to obtain a second transmitted beam, wherein the second optical element comprises a phase transformation mask; obtaining second intensity data for the second transmitted beam; and determining the phase data for the optical signal based on the first intensity data and the second intensity data. Transmitting the optical signal through the second optical element may comprise locating the second optical element so that the optical signal is transmitted through both the first optical element and the second optical element to obtain the second transmitted beam. Transmitting the optical signal through the first optical element may comprise transmitting the optical signal through a lens to obtain the first transmitted beam, the optical signal not passing through the phase transformation mask. Transmitting the optical signal through the second optical element may comprise transmitting the optical signal through a lens and through the phase transformation mask to obtain the second transmitted beam. A method to determine phase data for an optical signal may further comprise directing a light beam towards an object, wherein the optical signal is generated from an interaction of the light beam with the object, such as transmission, absorption, reflection, diffraction, or any combination thereof. A method to determine phase data for an optical signal comprises may further comprise forming an image of the object from the phase data.

In some examples, a method to form an image of an object comprises: directing a light beam towards the object to produce an optical signal from an interaction between the light beam and the object; transmitting the optical signal through a first optical element to obtain a first transmitted beam; obtaining first intensity data for the first transmitted beam; transmitting the optical signal through a second optical element to obtain a second transmitted beam, wherein the second optical element comprises a phase transformation mask; obtaining second intensity data for the second transmitted beam; determining phase data for the optical signal based on the first intensity data and the second intensity data; and forming an image of the object using the phase data. The interaction may be selected from a group of interactions, such as reflection, transmission, absorption, diffraction, diffusion, scattering, or any combination thereof.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure includes the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method to determine phase data of an optical signal, the method comprising:
    transmitting the optical signal through a first optical element;
    obtaining, by an optical sensor, first intensity data at a first focal plane of the first optical element;
    transmitting the optical signal through a second optical element, wherein the second optical element comprises a phase transformation mask;
    obtaining, by the optical sensor, second intensity data at a second focal plane of the second optical element; and
    determining the phase data of the optical signal based on the first intensity data and the second intensity data, wherein determining the phase data of the optical signal comprises iteratively applying a spiral phase constraint and an aperture constraint to the first intensity data and the second intensity data.

2. The method of claim 1, wherein the spiral phase constraint corresponds to the phase transformation mask and the aperture constraint corresponds to the first optical element.

3. The method of claim 1, wherein iteratively applying the spiral phase constraint and the aperture constraint comprises:
    determining a first field value based on the first intensity data and a guess phase value;
    calculating an inverse Fourier transform of the first field value to obtain a first aperture field;
    applying the spiral phase constraint and the aperture constraint to the first aperture field to obtain a constrained first aperture field;
    calculating a Fourier transform of the constrained first aperture field to obtain a data domain constrained first aperture field, wherein the data domain constrained first aperture field includes a first phase component; and
    calculating a second field value based on the data domain constrained first aperture field, wherein an amplitude component of the second field value is based on the second intensity data and a phase component of the second field value is equal to the first phase component.

4. The method of claim 3, wherein iteratively applying the spiral phase constraint and the aperture constraint further comprises:
    calculating an inverse Fourier transform of the second field value to obtain a second aperture field;
    applying a conjugate spiral phase constraint and the aperture constraint to the second aperture field to obtain a constrained second aperture field;
    calculating a Fourier transform of the constrained second aperture field to obtain a data domain constrained second aperture field, wherein the data domain constrained second aperture field includes a second phase component; and calculating an updated first field value based on the data domain constrained second aperture field, wherein an amplitude component of the updated first field value is based on the first intensity data, and a phase component of the updated first field value is equal to the second phase component.

5. The method of claim 4, wherein calculating the updated first field value further comprises comparing the updated first field value with the first field value and updating the first field value by applying the spiral constraint and the aperture constraint until a converged value of a first field value function is obtained.

6. The method of claim 5, wherein determining the phase data of the optical signal is further based on the converged value of the first field value function.

7. The method of claim 1, further comprising directing a light beam towards an object, wherein the optical signal is generated from an interaction of the light beam with the object.

8. The method of claim 7, further comprising forming an image of the object from the phase data.

9. An apparatus configured to determine phase data of an optical signal, the apparatus comprising:
  an optical assembly that comprises a first optical element and a second optical element, wherein the second optical element comprises a phase transformation mask, and wherein the optical assembly is configured to transmit the optical signal through the first optical element and the second optical element;
  an optical sensor placed in a first focal plane of the first optical element and in a second focal plane of the second optical element, wherein the optical sensor is configured to obtain first intensity data at the first focal plane of the first optical element and to obtain second intensity data at the second focal plane of the second optical element, and wherein the first intensity data and the second intensity data correspond to the transmitted optical signal; and
  an image processor coupled to the optical sensor, wherein the image processor is configured to process the first intensity data and the second intensity data to determine the phase data of the optical signal, and wherein to determine the phase data of the optical signal, the image processor is configured to iteratively apply a spiral phase constraint and an aperture constraint to the first intensity data and the second intensity data.

10. The apparatus of claim 9, wherein the optical assembly further comprises a light source configured to generate a light beam that is transmitted through an object to generate the optical signal.

11. The apparatus of claim 10, wherein the light beam from the light source is reflected from the object to generate the optical signal.

12. The apparatus of claim 10, wherein the object comprises a transparent object, a partially transparent object, a reflective object, or combinations thereof.

13. The apparatus of claim 10, wherein the light source comprises a laser source, a collimated narrowband thermal source, a light-emitting diode (LED) source, or combinations thereof.

14. The apparatus of claim 10, wherein the optical assembly further comprises a spatial filter and a third optical element placed between the light source and the object, wherein the spatial filter is configured to filter the light beam to generate a filtered beam, and wherein the third optical element is configured to direct the filtered beam towards the object.

15. The apparatus of claim 9, wherein the first optical element comprises a lens, a concave mirror, a convex mirror, or combinations thereof.

16. The apparatus of claim 9, wherein the optical sensor comprises a complementary metal oxide semiconductor (CMOS) sensor, a charge coupled device (CCD) sensor, a photographic film, or combinations thereof.

17. The apparatus of claim 9, wherein the phase transformation mask comprises a spiral phase transformation mask, a pseudo-random phase coded mask, or combinations thereof.

18. The apparatus of claim 9, wherein the second optical element comprises a fork grating and a lens, and wherein the fork grating comprises an amplitude fork grating, a phase fork grating, a binary amplitude-phase grating, a Dammann vortex phase grating, or combinations thereof.

19. The apparatus of claim 9, wherein the spiral phase constraint corresponds to the phase transformation mask and the aperture constraint corresponds to the first optical element.

20. The apparatus of claim 9, wherein the optical assembly further comprises a beam splitter configured to split the optical signal into a first optical signal and a second optical signal, and wherein the optical assembly is configured to transmit the first optical signal through the first optical element and to transmit the second optical signal through the second optical element to generate the first intensity data and the second intensity data.

21. The apparatus of claim 9, wherein the apparatus is an imaging device that comprises a camera, a microscope, a telescope, or combinations thereof.

22. A method to form an image of an object, the method comprising:
  directing a light beam towards the object to produce an optical signal from an interaction between the light beam and the object;
  transmitting the optical signal through a first optical element to obtain a first transmitted beam;
  obtaining first intensity data for the first transmitted beam;
  transmitting the optical signal through a second optical element to obtain a second transmitted beam, wherein the second optical element comprises a phase transformation mask;
  obtaining second intensity data for the second transmitted beam;
  determining phase data of the optical signal based on the first intensity data and the second intensity data, wherein determining the phase data of the optical signal comprises iteratively applying a spiral phase constraint and an aperture constraint to the first intensity data and the second intensity data; and
  forming the image of the object using the phase data.

23. The method of claim 22, wherein the interaction is selected from a group of interactions consisting of reflection, transmission, absorption, diffraction, diffusion, scattering, or combinations thereof.

24. The method of claim 22, wherein transmitting the optical signal through the first optical element comprises transmitting the optical signal through a lens to obtain the first transmitted beam, the optical signal not passing through the phase transformation mask.

25. The method of claim 22, wherein transmitting the optical signal through the second optical element comprises locating the second optical element so that the optical signal is transmitted through both the first optical element and the second optical element to obtain the second transmitted beam.

26. The method of claim 22, wherein transmitting the optical signal through the second optical element comprises transmitting the optical signal through a lens and through the phase transformation mask to obtain the second transmitted beam.

* * * * *